May 15, 1923.

J. F. ANDERSON

CANNING MACHINE

Filed Sept. 18, 1917 14 Sheets-Sheet 1

1,455,013

Inventor

John F. Anderson

By Harry G. Schwede
Attorney

May 15, 1923.

J. F. ANDERSON

CANNING MACHINE

Filed Sept. 18, 1917  14 Sheets-Sheet 4

Inventor
John F. Anderson

By Harry C. Schroeder
Attorney

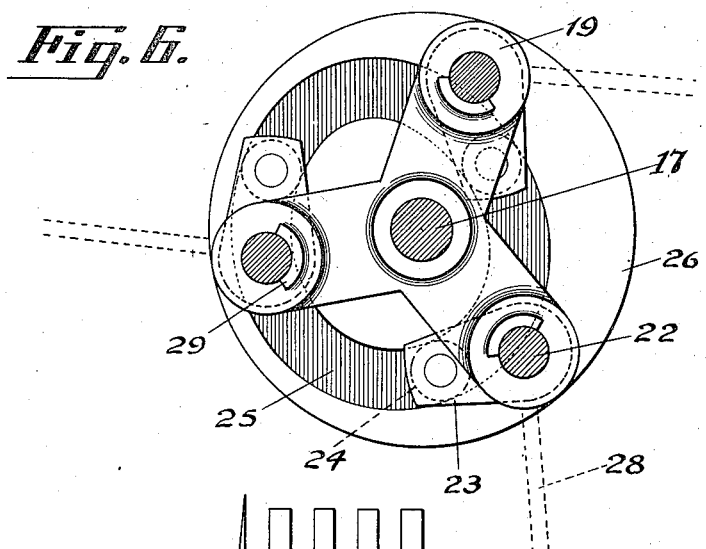
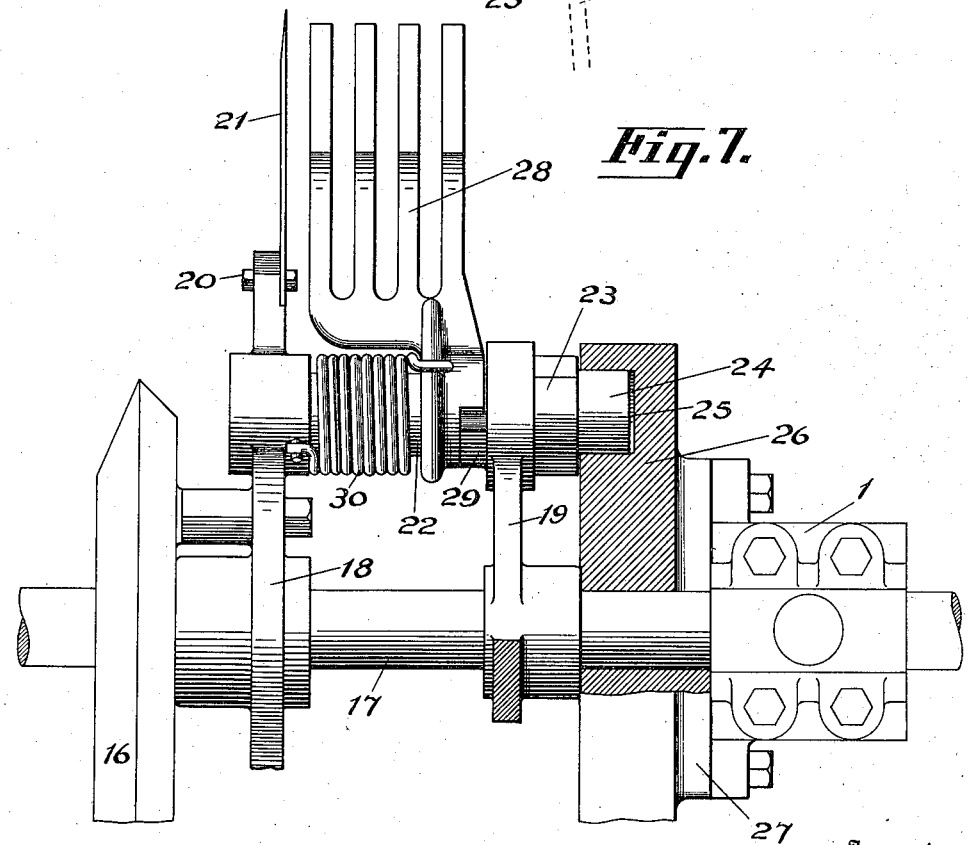

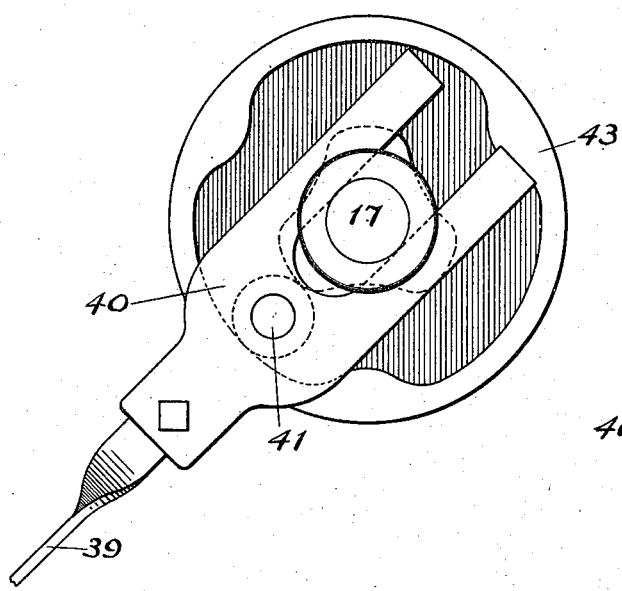
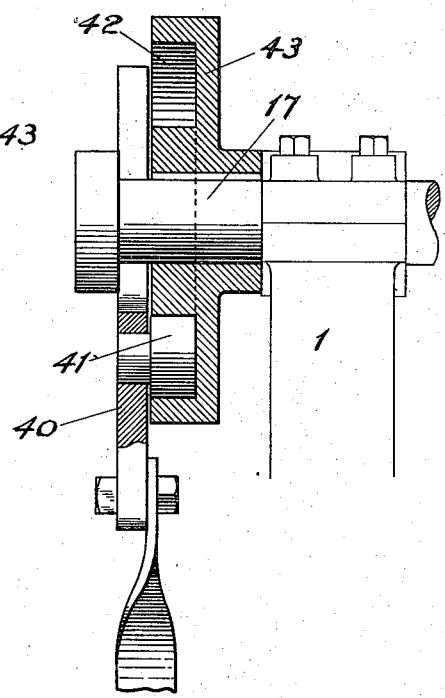
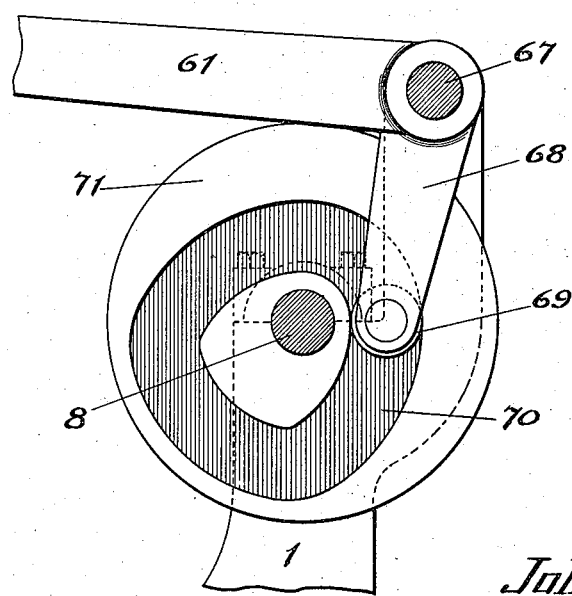

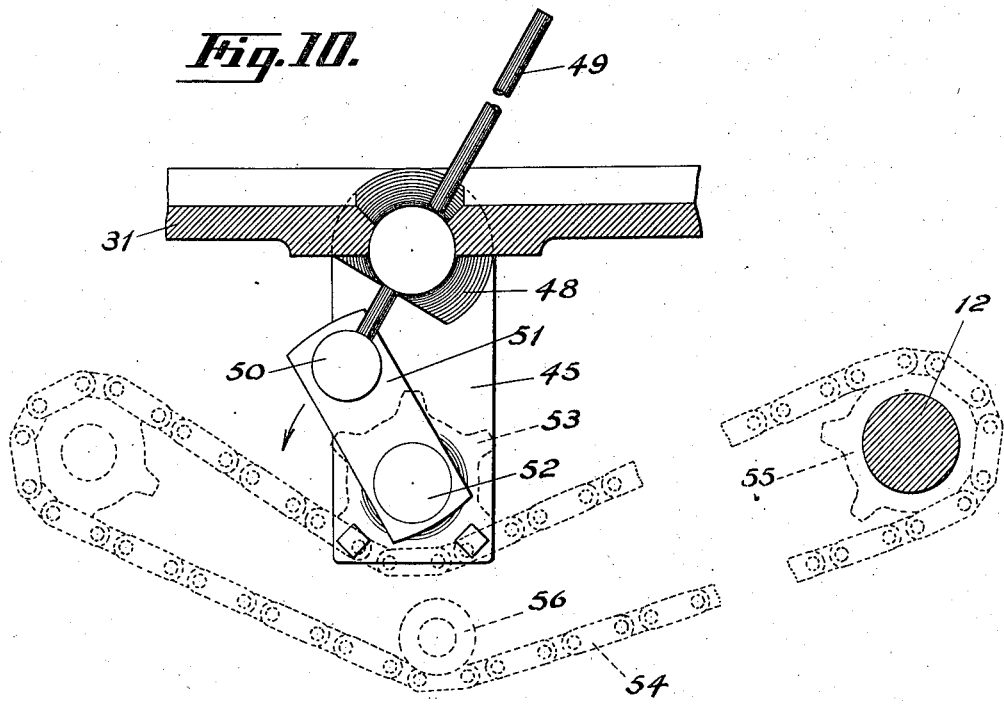
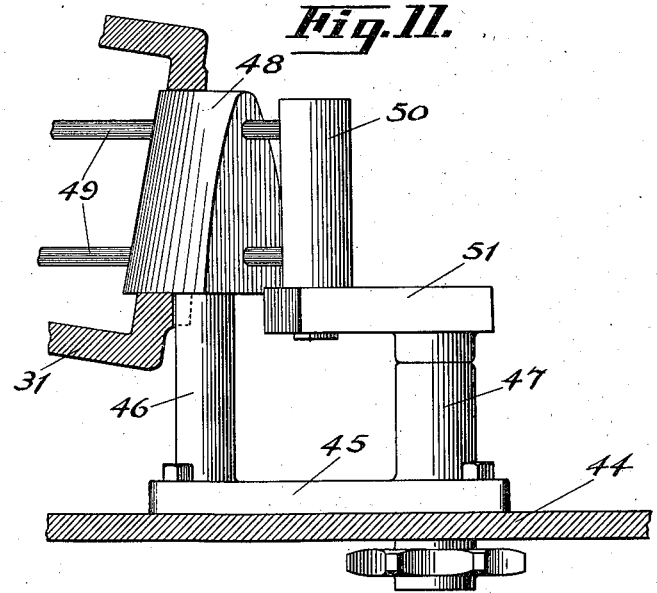

May 15, 1923.
J. F. ANDERSON
CANNING MACHINE
Filed Sept. 18, 1917 14 Sheets-Sheet 8
1,455,013
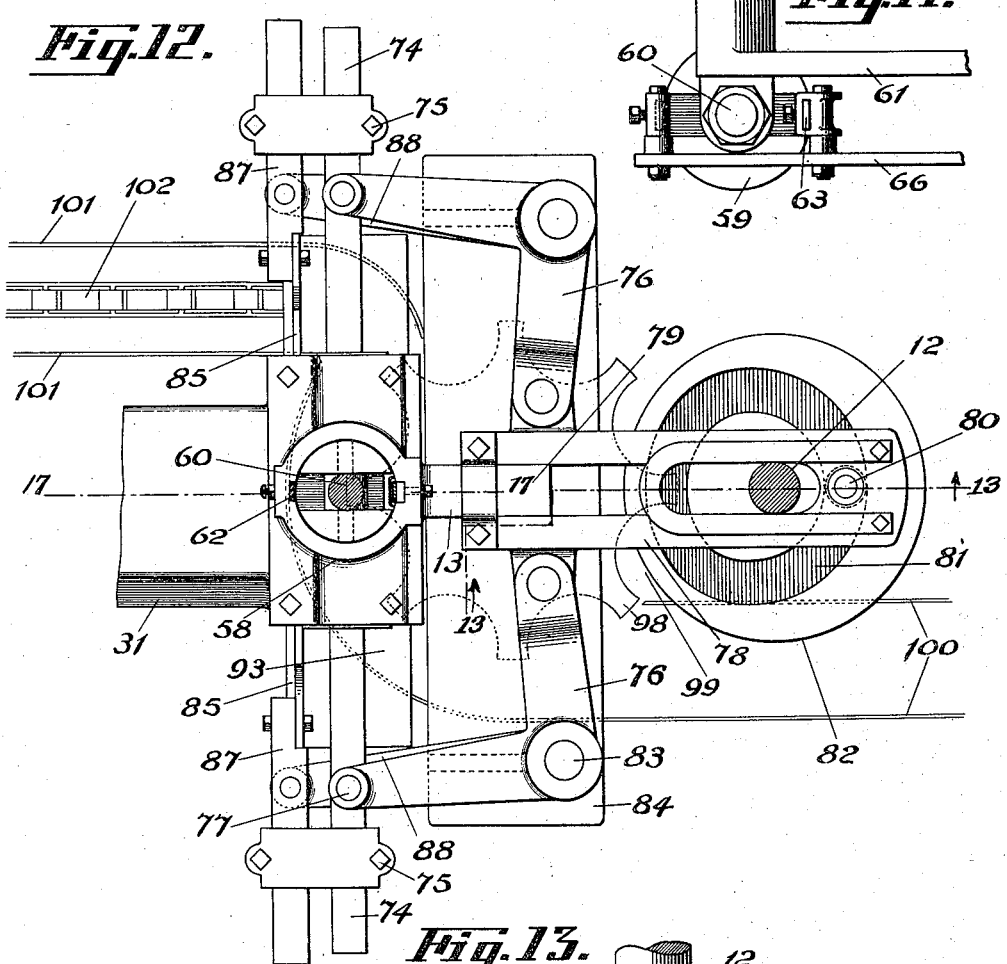
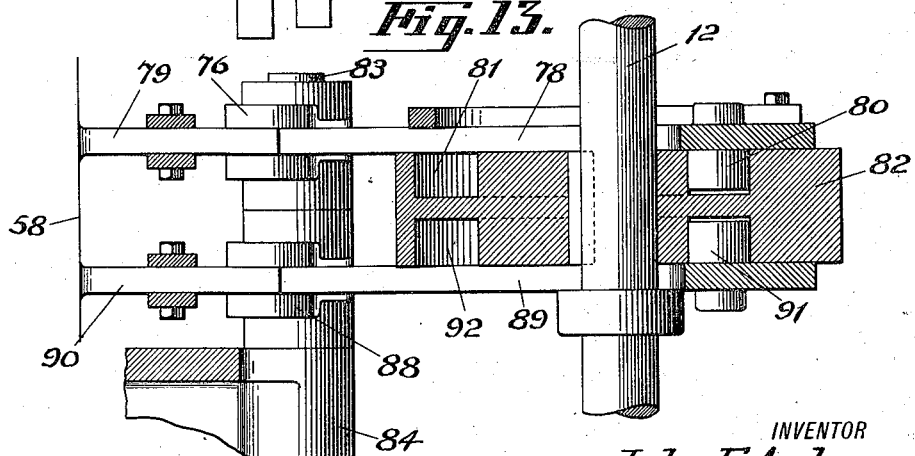
INVENTOR
John F. Anderson
BY
Harry Schweder
ATTORNEY

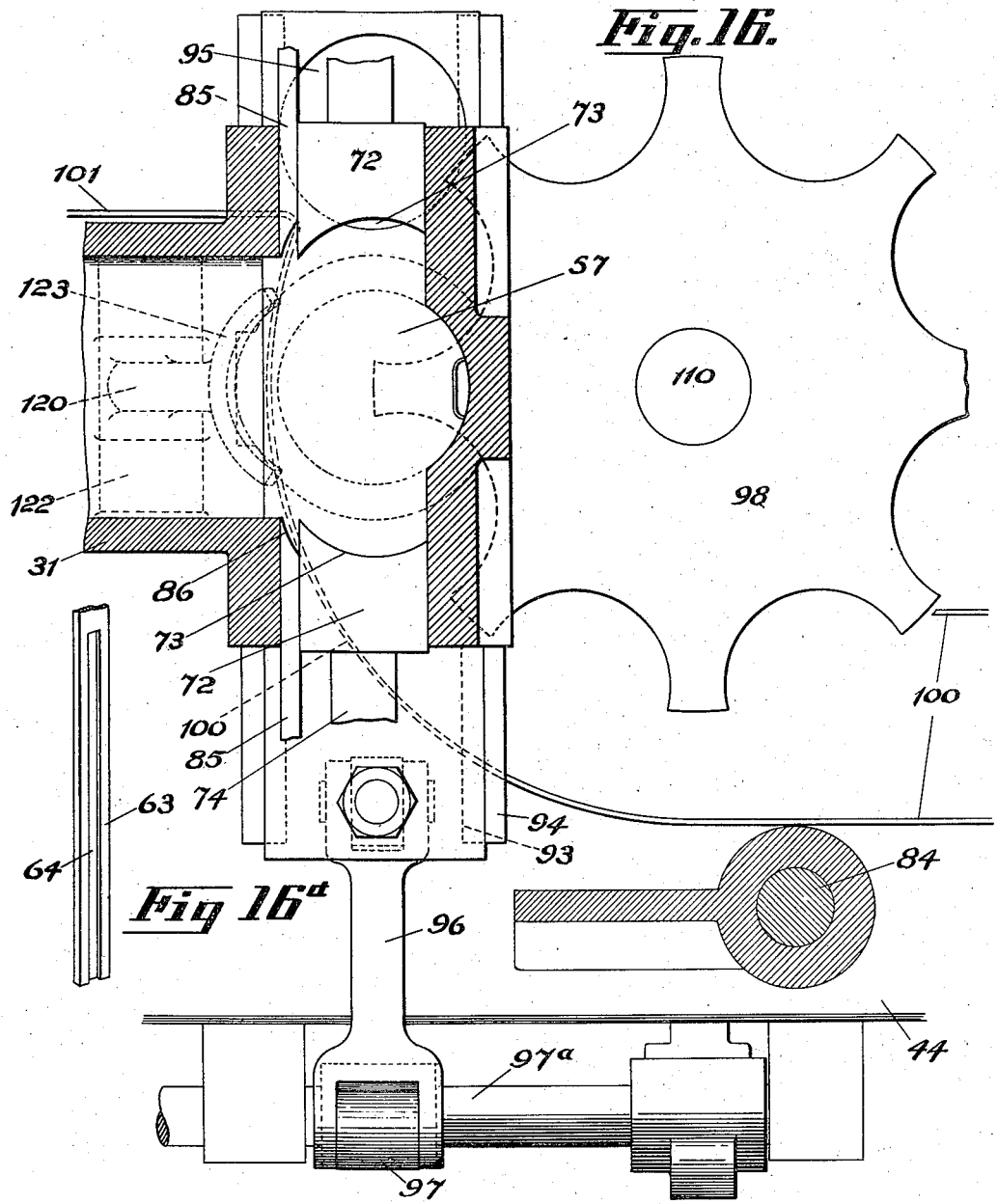
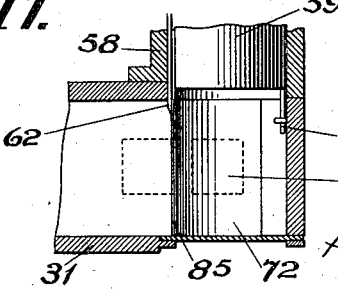

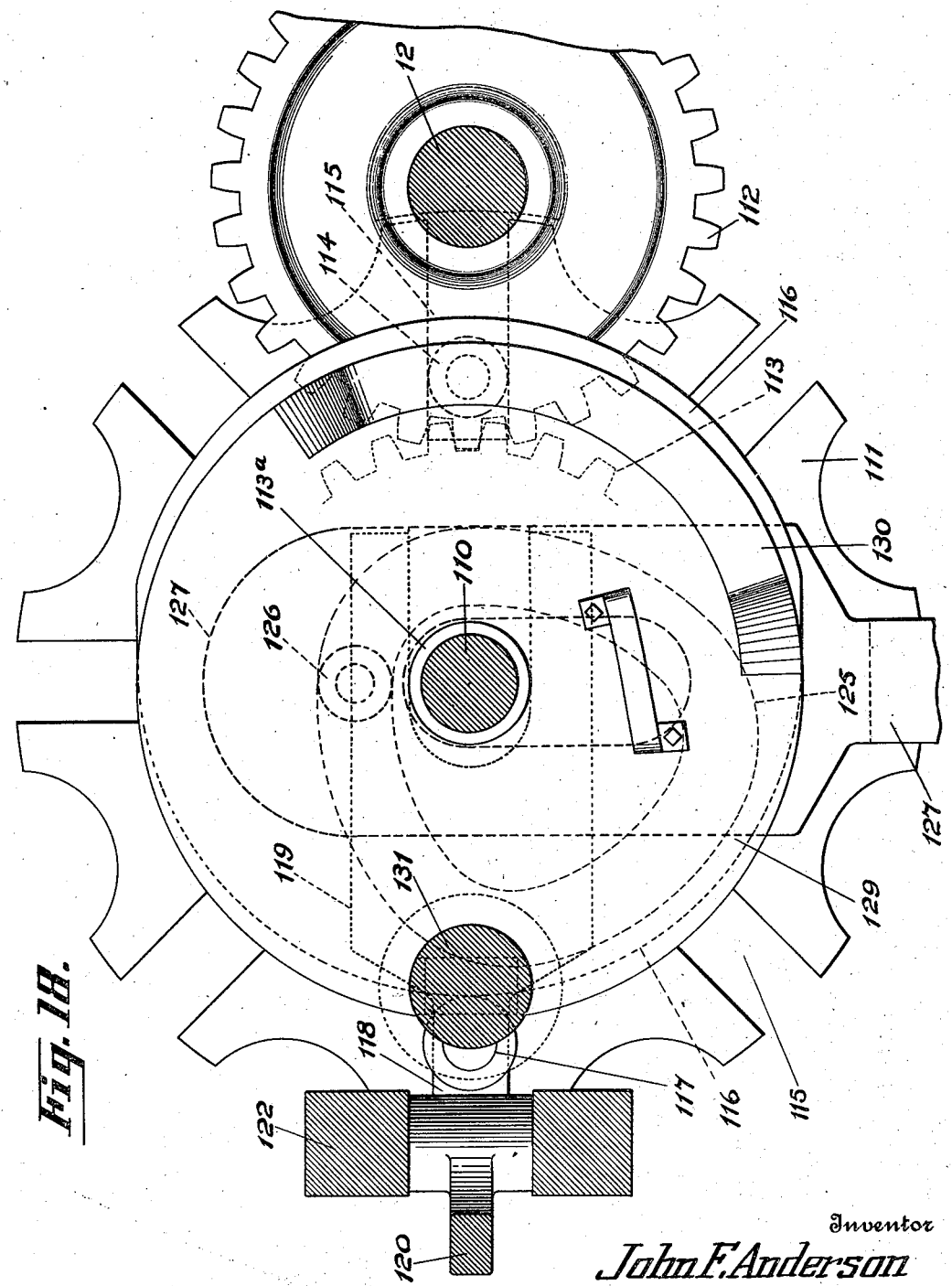

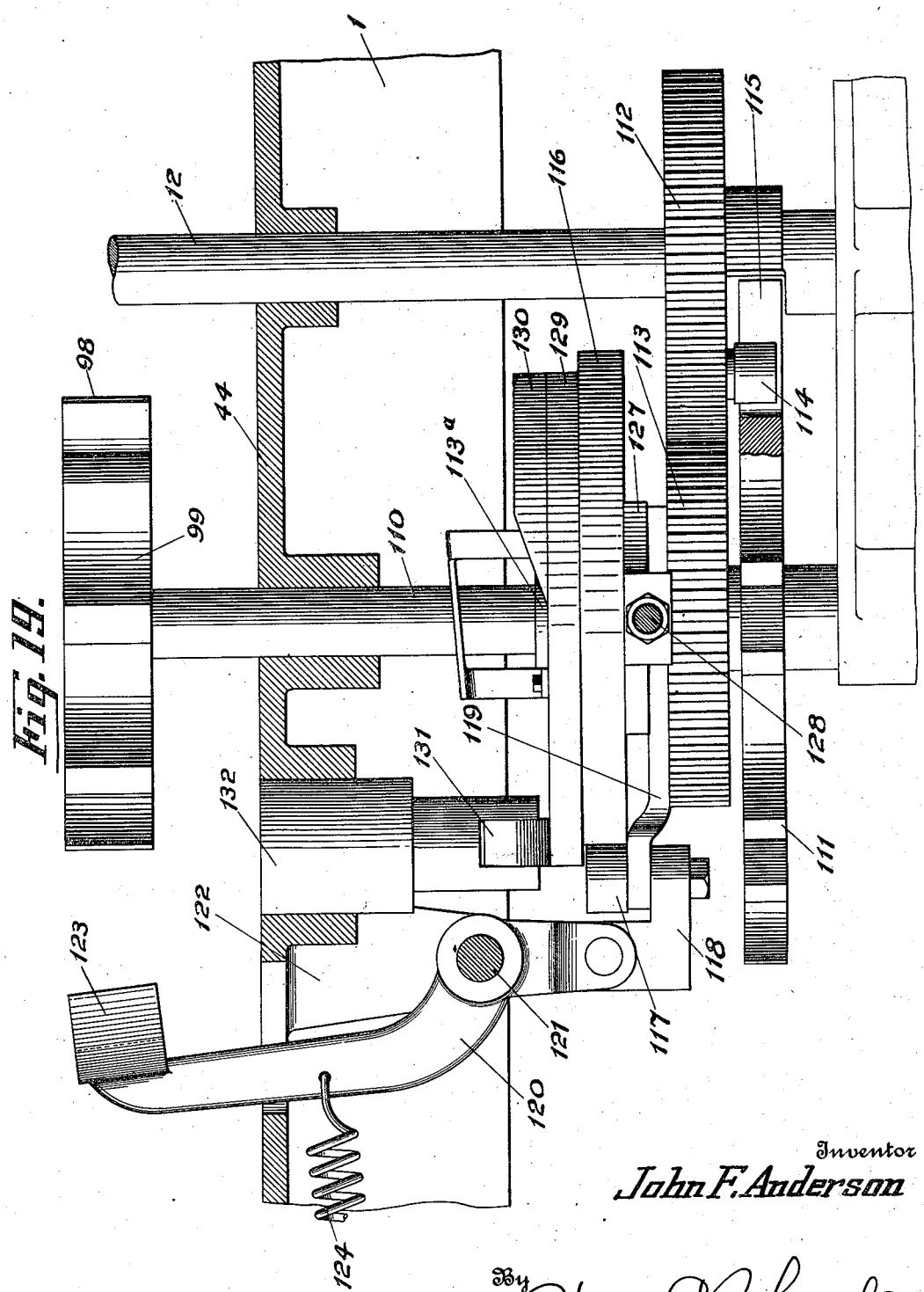

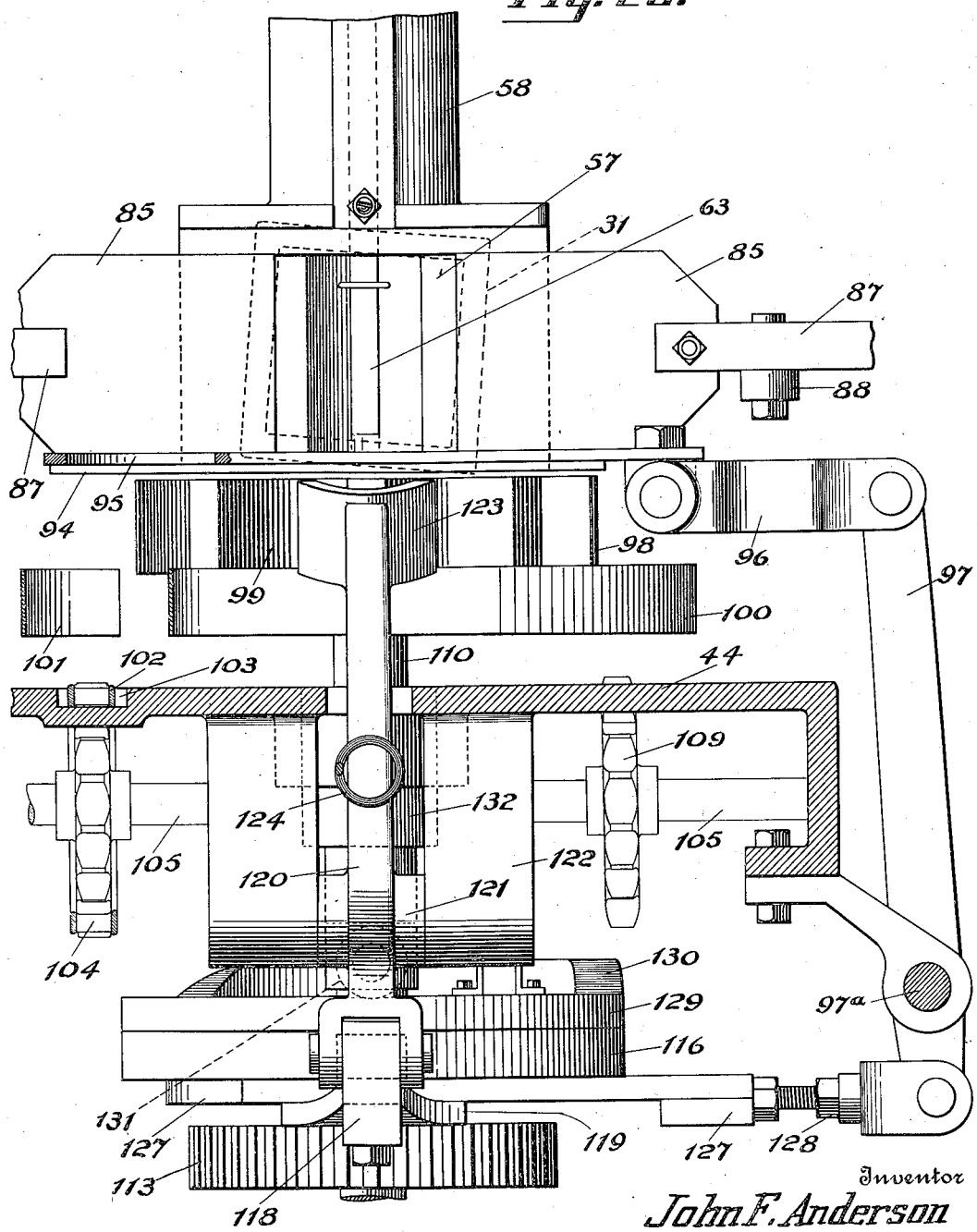

May 15, 1923.
J. F. ANDERSON
CANNING MACHINE
Filed Sept. 18, 1917    14 Sheets-Sheet 13
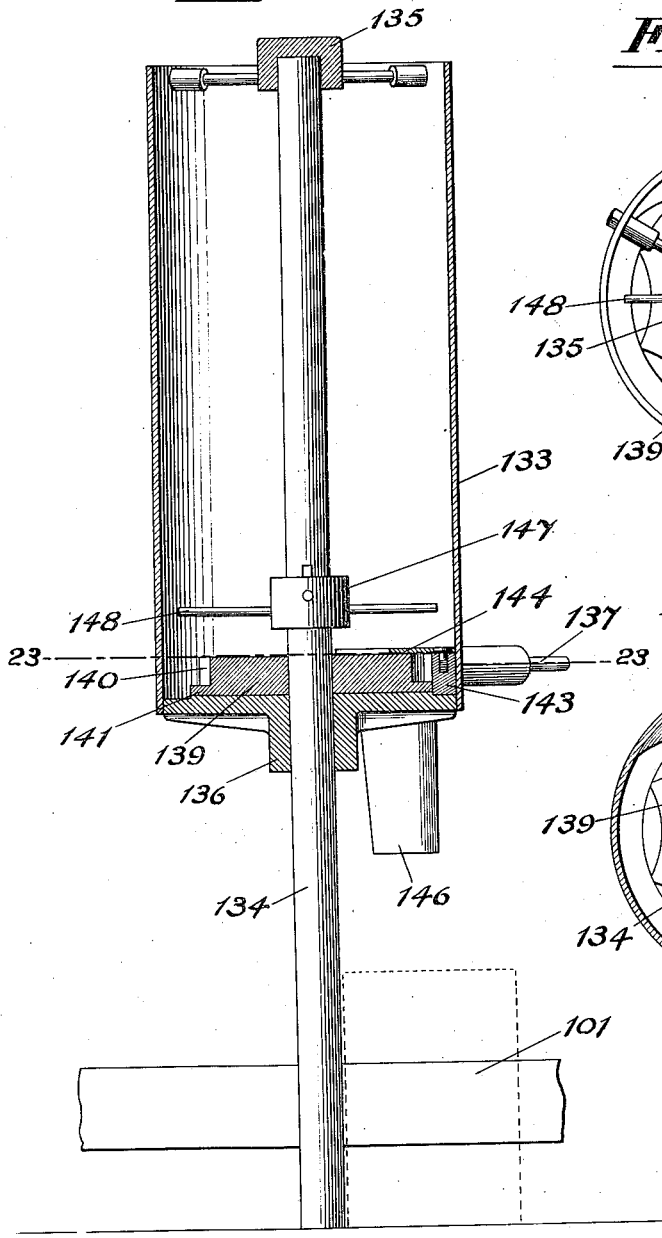
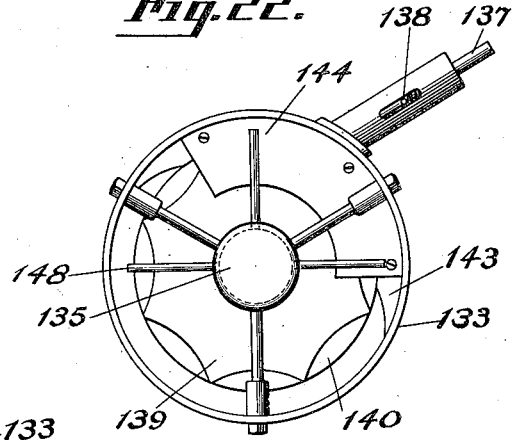
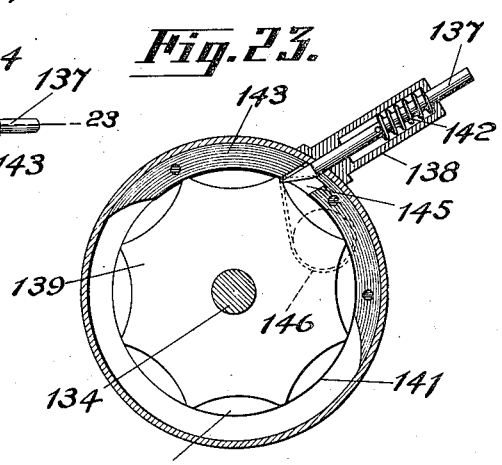
Inventor
John F. Anderson
By Harry G. Schroeder
Attorney

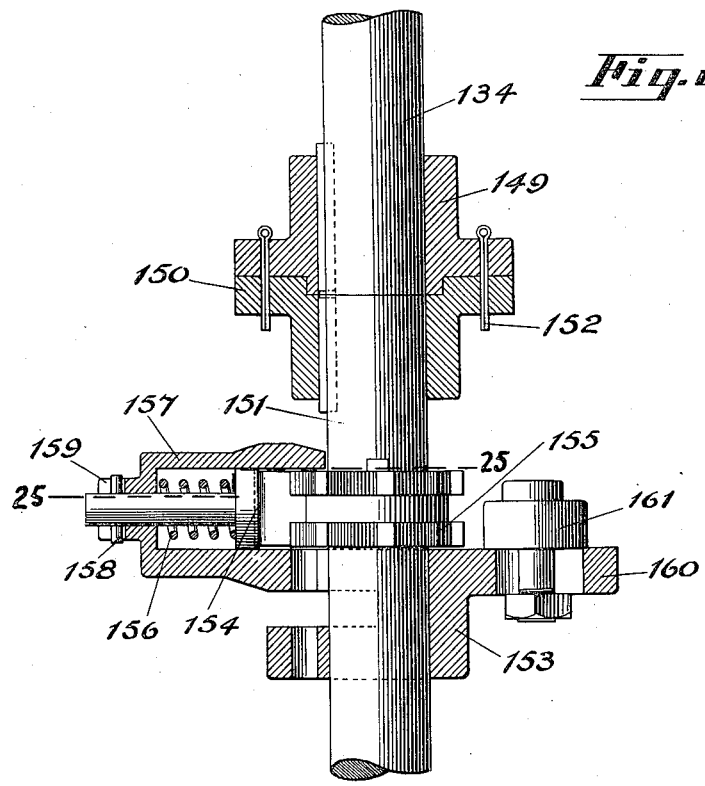
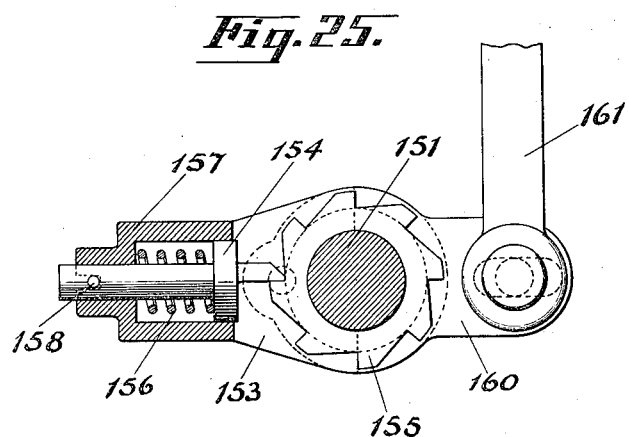

Patented May 15, 1923.

1,455,013

UNITED STATES PATENT OFFICE.

JOHN F. ANDERSON, OF OAKLAND, CALIFORNIA.

CANNING MACHINE.

Application filed September 18, 1917. Serial No. 191,922.

*To all whom it may concern:*

Be it known that I, JOHN F. ANDERSON, citizen of the United States, residing at Oakland, in the county of Alameda and State of California, have invented certain new and useful Improvements in Canning Machines, of which the following is a specification.

This invention relates to fish canning machines.

The principal object of this device is to provide a small canning machine which will fill the cans in a vertical position, and therefore reduce the waste that occurs in a machine in which the cans are filled in a horizontal position.

It will be seen that when a can is filled in a fish canning machine in a horizontal position, that more or less fish will be spilled on the sides, whereas if the can is in a vertical position the fish will fall into the can and not off to one side. A machine of this character can also be run at a much higher speed. A further object is to provide improved means for cutting the fish into sections and feeding the sections to a filling chamber where they may be readily placed into the cans. A further object is to provide means for compressing and trimming the sections of fish as they are placed into the cans. A further object is to provide improved means for venting the cans during the filling operation to facilitate that operation. A further object is to provide improved means for positioning and holding the cans during the filling operation. A further object is to provide means for automatically supplying the filled cans with measured quantities of salt.

The invention will be hereinafter fully set forth and particularly pointed out in the claims.

In the accompanying drawings:—

Figure 1:
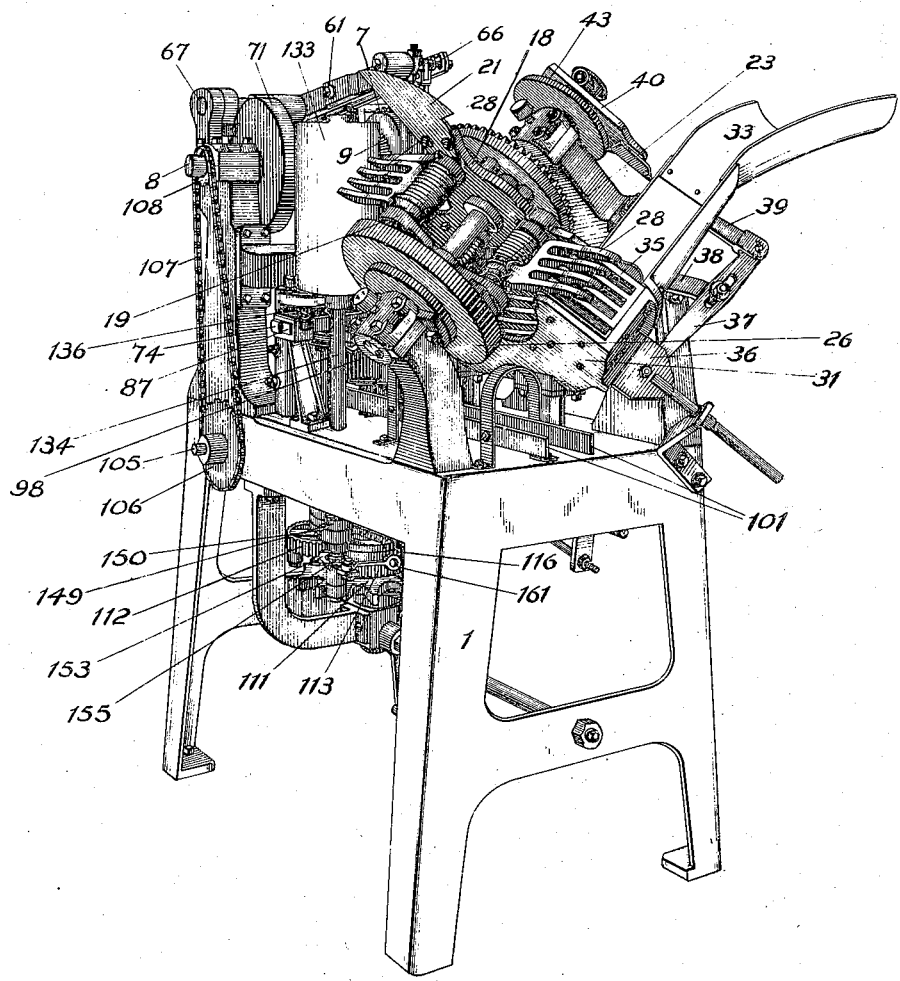
Figure 2:
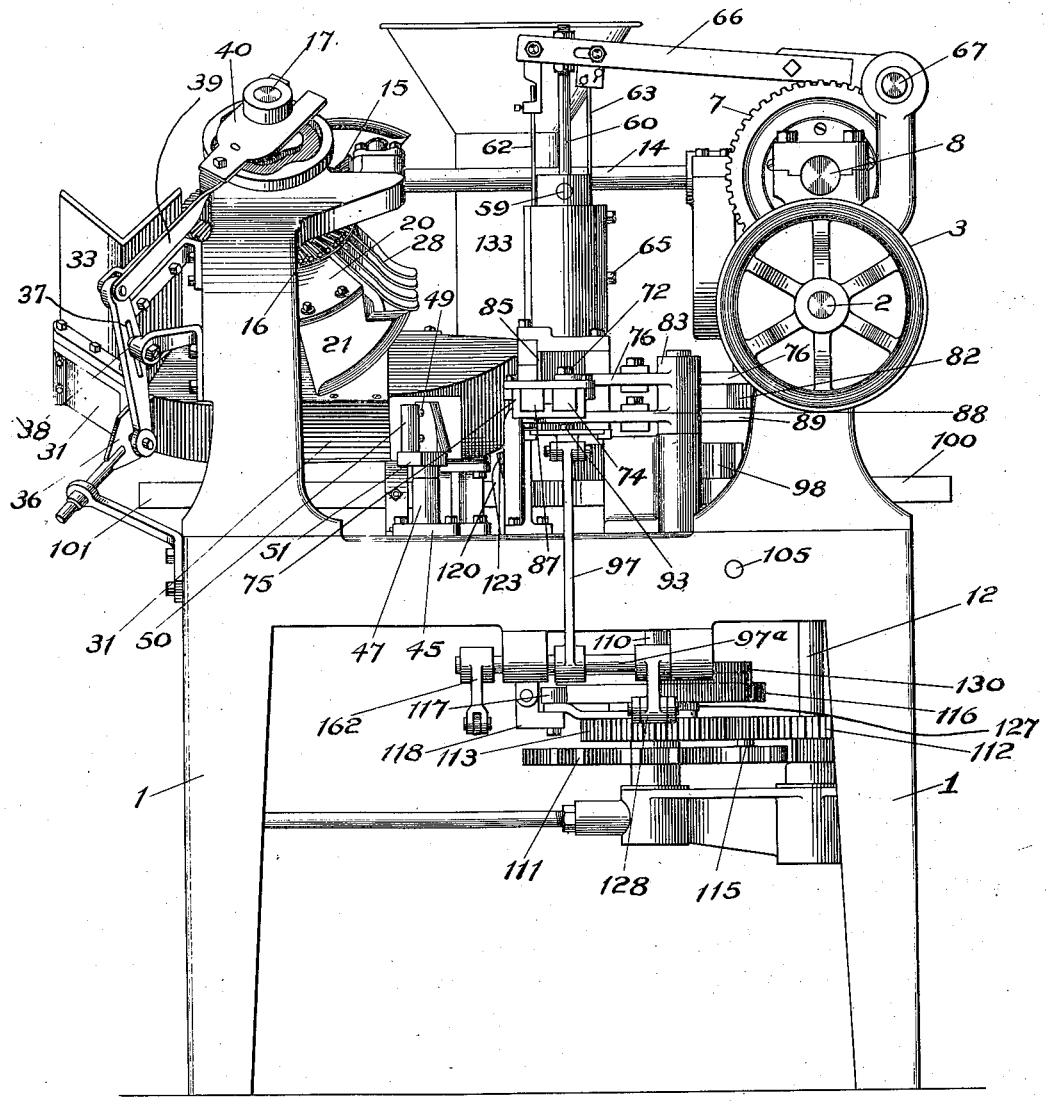
Figure 3:
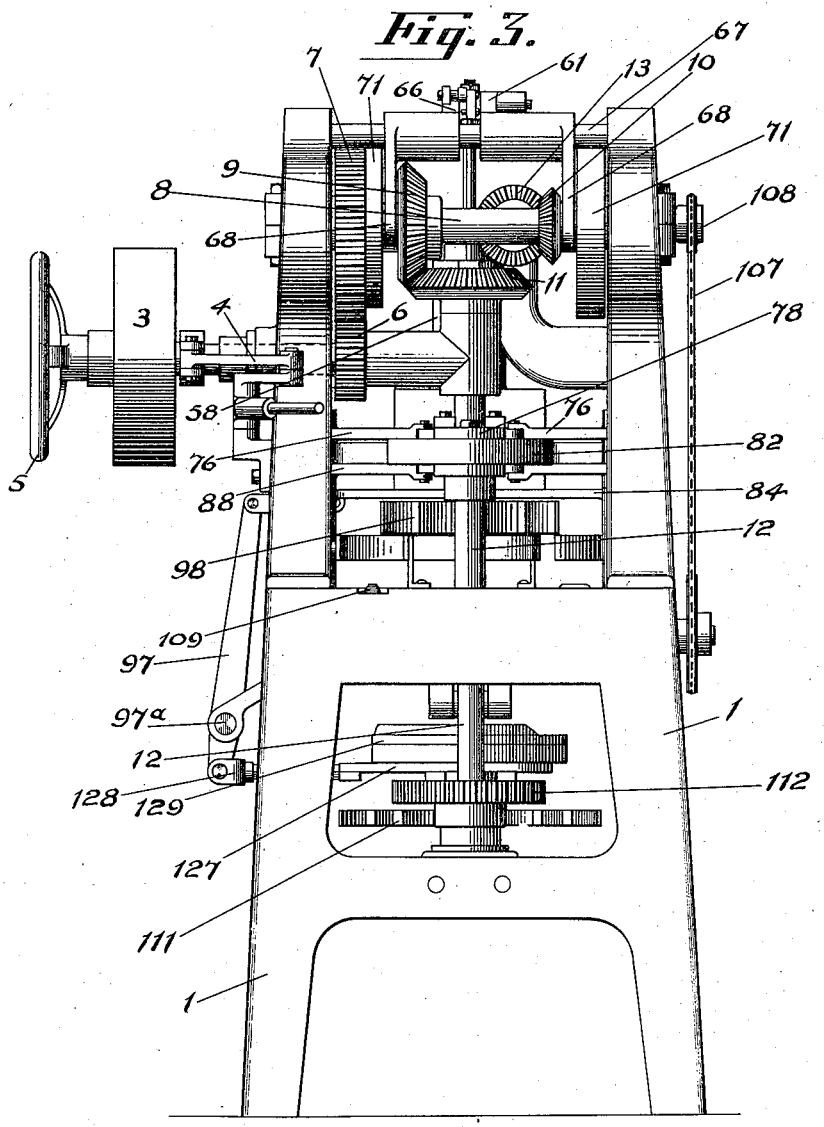
Figure 4:
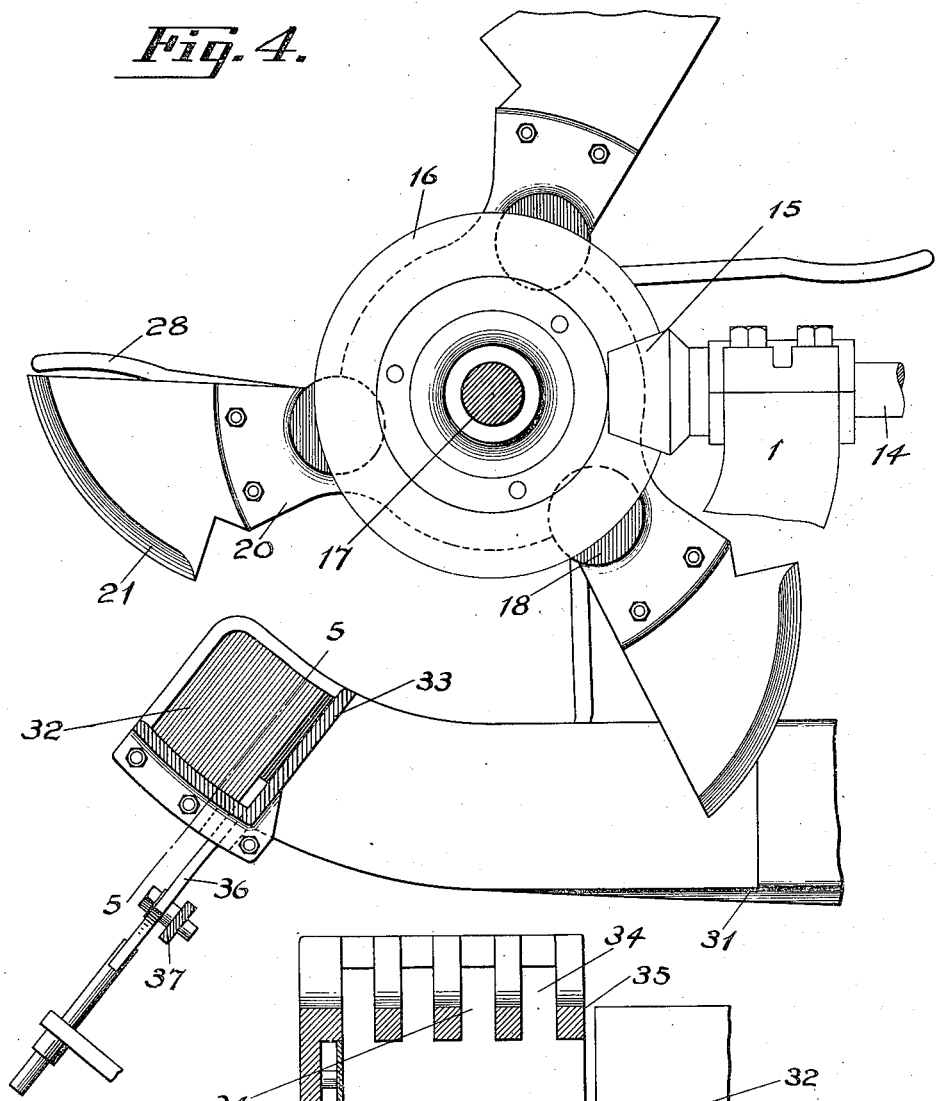
Figure 5:
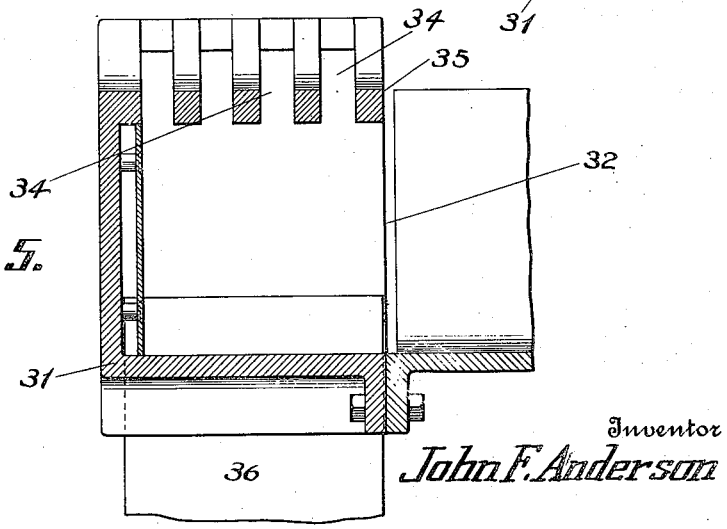

Figure 1 is a perspective elevation of the complete machine. Figure 2 is a side elevation of same. Figure 3 is an end elevation of same. Figure 4 is a fragmentary side elevation of the fish cutting mechanism. Figure 5 is a section on a line 5—5 of Figure 4. Figure 6 is a side elevation of a cam mechanism for operating the feeding forks. Figure 7 is an end elevation of a feeding fork member. Figure 8 is a side elevation of a cam mechanism for operating a feed stop plate. Figure 9 is a cross section of same. Figure 10 is a top plan view of an auxiliary feeding mechanism. Figure 11 is an end elevation of same. Figure 12 is a top plan view of the fish compressing mechanism. Figure 13 is a sectional view on a line 13—13 of Figure 12. Figure 14 is a fragmentary top plan view of a plunger mechanism. Figure 15 is a side elevation of a cam mechanism for operating the same. Figure 16 is a top plan view, partly in section, of the fish compressing compartment and mechanism. Figure 16$^a$ is a perspective view of a portion of an air-releasing blade. Figure 17 is a fragmentary cross section relatively on a line 17—17 of Figure 12. Figure 18 is a top plan view of a can feed control mechanism. Figure 19 is a side elevation of same. Figure 20 is an end elevation of the can feeding and filling mechanism. Figure 21 is a sectional elevation of a salt feed container. Figure 22 is a top plan view of the same. Figure 23 is a cross section of same relatively on a line 23—23 of Figure 21. Figure 24 is a sectional elevation of a salt feed control mechanism. Figure 25 is a cross section of same relatively on a line 25—25 of Figure 24.

There are in the main three distinct operations to this machine, viz:—The cutting and feeding mechanism, the can filling mechanism, and the salting mechanism. These will be described in the order named.

*Cutting and feeding mechanism.*—Referring to Figures 1 to 11 of the drawings, 1 represents the main frame of the machine. Journaled thereon at one end is a horizontally disposed drive shaft 2, on which is mounted a driving pulley 3, thrown into operation by a clutch 4. A hand wheel 5 is also secured to said shaft. Keyed to the drive shaft 2 is a pinion 6, meshing with a spur gear 7, keyed to shaft 8 rotatably supported above shaft 2. On shaft 8 are secured two bevel gears 9 and 10. Gear 9 meshes with a bevel gear 11 on a vertically disposed shaft 12, extending downwardly therefrom, which shaft will be referred to later, and gear 10 meshes with a bevel gear 13, on a longitudinally disposed horizontal shaft 14, suitably journaled in frame 1. At the further end of shaft 14, is keyed a bevel gear 15, meshing with gear 16, on a cutter shaft 17 extending across the machine and mounted diagonally in frame 1. It will be noted that in all of the views of the drawing dealing with this mechanism except Figure 1, they are shown as on a vertical plane for the sake of simplicity and clearness.

Keyed to the cutter shaft 17, are two three-armed members 18 and 19, mounted in spaced relation. To the outer ends 20 of the arms of member 18, are secured knives 21 for a purpose which will appear later. Short carrier shafts 22 connect arms of members 18 and 19, being rotatably supported by said members, said shafts extending through members 19, having mounted thereon, on the outside of said members, cranks 23, in which are mounted cam-followers 24, adapted to roll in the groove 25 of a cam plate 26, which is stationary, being held rigid with frame 1, as at 27. Keyed to shafts 22 these being held normally against lugs 29 on the arms of members 19 are forks or finger-like feed members 28, by coil springs 30 (Figs. 6 and 7).

Mounted on frame 1, and in line with the foregoing described mechanism, is an enclosed chute 31 (Figs. 1, 4 and 5), having a side opening 32, about the same area as the cross section of the chute, to which a trough 33 leads. Slots 34 are cut in the end and top of said chute 31 for a certain distance, to allow of the passage of fingers 28 therebetween, the knives 21 coming outside chute 31 and flush therewith. there being sufficient space between said chute and the trough 33, as indicated at 35 in Fig. 5, to permit of the passage of the same.

Running across said chute 31, at the end of opening 32 and slidably mounted therein, is a plate or stop-member 36. Attached to this plate and outside of said chute is one end of a lever 37, the same being fulcrumed in the middle or thereabouts, as at 38, the other end being attached to one end of an arm 39, which is secured at its farther end to a forked plate 40 which fits over shaft 17 and acts as a guide member (Figs. 1 and 2). A cam follower 41 on the plate 40 is adapted to travel in the groove 42, in a cam plate 43, secured to shaft 17 and rotating therewith (Figs. 8 and 9).

Secured on the table 44, which is a component part of frame 1, is a base member 45 having thereon two vertical bearings 46 and 47 (Fig. 11). In bearing 46 is rotatably mounted a cone shaped auxiliary feed member 48, the face of the cone of which is on the same angle as the side of the chute 31, into which the cone projects. Running through said cone and slidably mounted therein are two horizontal pins or fingers 49, one being directly above the other, and adapted to reach across the inside of said chute 31. The outer ends of said pins are secured to a vertical pin 50, rotatably mounted on a crank 51, secured to a shaft 52, turning in bearing 47, and passing down below table 44, and provided with a sprocket wheel 53, over which a chain 54 runs to sprocket 55, on shaft 12, there being idlers such as 56 where necessary (Fig. 10).

*Can filling mechanism.*—Chute 31 terminates in a filling chamber 57, and it will be here noted that said chute has been twisted in such a manner that at said chamber 57, the cross section of same is about vertical. Centrally mounted above said chamber is a cylindrical member 58, in which a plunger 59 is adapted to move vertically, said plunger being of slightly smaller diameter than one of the cans to be filled. Pivoted in said plunger is a rod 60, which is connected at its upper end to a lever arm 61 (see Figs. 1, 3 and 14). A thin chisel 62, is slidably mounted in said member 58 in the side nearest the chute 31, just clear of plunger 59 (see Figure 12), while diametrically opposite to same is a thin member 63 for venting the can while being filled. As can be clearly seen from Fig. 16ª, the member 63 has a longitudinal groove or slot 64 therein and is to be projected into the can in advance of the plunger as will later appear. The exact adjustment of strip 63 is obtained by means of set screws 65. Said members 62 and 63 are both connected at the top of lever arm 66, which, together with lever arm 61 is fulcrumed on shaft 67, mounted on frame 1 above shaft 8. Both levers are cam-operated in a similar manner, downwardly extending arms 68 from lever members 61 and 66 having on their lower ends cam-followers 69, adapted to travel in cam grooves 70 in the plate cams 71 mounted on shaft 8.

Horizontally and slidably mounted in chamber 57 and on opposite sides thereof are compression blocks 72 (Fig. 16), the inner faces of which are curved as at 73 to conform to the size and shape of a can, such as is to be used in connection with this machine. Bars 74 are connected to the outer ends of said blocks, their farther ends passing through guide members 75 (Fig. 12). Bell crank levers 76 each have one arm pivoted on the top side of a bar 74, as at 77, the other end being pivoted to a sliding bar member 78, said members 78 being held in line by guide 79 at one end, the shaft 12 being between the bars 78 at the other. A cam follower 80, is attached to the underside of members 78, positioned to travel in cam groove 81, of a double plate cam 82. The bell-cranks 76 are both centrally fulcrumed as at 83, to a bearing member 84. It will be readily seen that as both bell cranks are connected with the one cam movement, their length of travel will be the same, and hence the blocks 72 will approach the center of chamber 57 with equal rapidity.

Slidably mounted alongside said blocks 72 on their edges nearest said chute 31 are plates 85, such as will completely close chute 31 from chamber 57. These plates have chisel edges 86, with a curvature the same as blocks 72, and are secured to bars 87, similar to bars 74, which bars 87 also run through guides 75. Said bars are also connected, on the underside thereof, to bell cranks 88, and thence to members 89, having guide bar 90, cam follower 91, operating in groove 92 in the under face of cam 82, in a similar manner to the cam movement of blocks 72, except that the travel will be slightly longer, on account of the increased length of one arm of each bell crank 88, as will be seen.

Slidably mounted under said blocks 74 and plates 85, and adapted to close the bottom of chamber 57, which is otherwise open, is a plate 93, running in guide members 94, and having a circular orifice 95 at one end therein, adapted to receive plunger 59 therethrough. A link 96 connects the outer end of this plate with the upper end of a lever arm 97 fulcrumed on a shaft 97$^a$ the lower end of which is connected to a cam movement, which will be hereinafter described.

Centrally located under chamber 57 is a circular can feeding member 98, so placed that its upper face is slightly below the under edge of plate 93, and its circumferential edge is tangent to the vertical center line of the plunger 59. In the side of member 98 are eight equally spaced semicircumferential sockets or recesses 99. Vertical can-guiding strips 100 extend from one end of the table 44 to the feeding member 98, the center between the two guides being co-incident with the periphery of the member 98, one of said strips 100 being continued around concentric with member 98. Similar guide strips 101, receive and guide the cans after being filled, the cans being moved to the other end of the table, by means of a chain conveyor 102, set in a groove 103, in table 44, said chain running over a sprocket 104, on shaft 105, which shaft is provided with a chain sprocket 106, on the outside of frame 1, on which runs a chain 107 engaging a sprocket 108 on shaft 8. A toothed wheel 109 on shaft 105, one tooth of which projects above the edge of table 44, aids in propelling the cans towards the filling point on the entering side.

The member 98 is operated by an actuating member 111, secured to shaft 110, to which member 98 is secured, said actuating member being operated from shaft 12 by means of a Geneva movement, thus allowing only one-eighth of a turn of shaft 110 to every full turn of shaft 12, (see Figure 18). On said shaft 12, above said member 111, is a gear 112 meshing with a gear 113 on a sleeve 113$^a$ on shaft 110. On the under side of gear 112 is a roller 114, which, operating in slots 115 is member 111, controls said Geneva movement of same.

Mounted likewise on said sleeve 113$^a$ and above said gear 113, is a cam plate 116. Against the face of this cam plate runs a roller 117, attached to a movable block 118, and having a guide plate 119, running on top of gear 113 and straddling shaft 110 and the sleeve 113$^a$. Block 118 is attached to the lower end of bell crank lever 120, fulcrumed at 121 in downwardly extending brackets 122, the top of member 120 terminating above the table 44, in a concavely curved piece 123, whose curvature is of the same radius as that of one of the aforementioned cans, and positioned to be brought into the same horizontal plane as member 98. A tension spring 124 attached at one end to bell crank lever 120 just under the table 44, and at the other end to frame 1, holds the said member normally away from the cans and the roller 117 normally against the cam 116.

On the underside of cam-plate 116 is a cam groove 125, adapted to receive a roller 126 on plate 127, connected by an adjustment link 128 to the lower end of lever 97. Mounted on sleeve 113$^a$ and directly above cam 116, is a circular plate 129, having a raised portion 130, for a certain distance around the outer edge thereof, on which is adapted to travel a roller 131, mounted in the lower end of an abutment plunger 132, extending upward through table 44, being slidably mounted therein, and being normally flush therewith for the purpose as will appear.

The salting mechanism consists of a stationary vertical cylindrical chamber 133, through the center of which a longitudinally-disposed shaft 134 is free to revolve, in top bearing or spider 135 and base member 136 of chamber 133. Projecting obliquely into said chamber and near the bottom thereof, is a knife-edge scraper member 137 slidably housed in a casing 138. Keyed to shaft 134 in the same plane with said knife-edge scraper member, is a circular plate 139, of a diameter smaller than that of cylinder 133, having eight concave spaces 140, in the periphery thereof, a ledge 141 being provided at the bottom of said spaces. Said knife-edge scraper member 137 is adapted to scrape the inner faces of spaces 140, and is held in contact therewith by means of a coil spring 142, in casing 138. For a certain distance around, a segment 143 is placed at the bottom of cylinder 133, filling in the space between the edge of plate 139 and the walls of chamber 133. A segmental plate 144 is secured to member 143 and extends over the spaces 140, as shown in Figure 22. Thus it will be seen that for a certain distance around, each space 140 forms an entirely enclosed pocket, isolated from the remainder of the chamber. Just forward of the knife-edge 137, an orifice 145 is cut through member 143, leading to an outlet 146, which centers over the filled can guides 101 at any suitable point desired.

A collar 147, keyed to shaft 134 a short distance above member 139, and having four rods 148 extending at right angles therefrom, keeps the salt stirred up.

Below table 44, shaft 134 terminates in a male coupling 149 fitting with a female coupling 150 on an extension shaft 151, these couplings being held together by means of light cotter pins 152. Revolubly mounted on shaft 151 is a casting 153, having at one end thereof a spring-dog member 154 adapted to engage with an eight tooth ratchet 155 keyed to shaft 151. Said dog 154 is kept in contact with the ratchet by means of a spring 156 in housing 157, this being a part of member 153, and is kept from turning by means of a dowel pin 158 in slot 159 in housing 157. On the opposite side of member 153 a lug 160 is attached to one end of a rod 161, the other end being connected with lever arm 162 on shaft 97ª, and operating in connection therewith.

The operation is as follows:—

The fish to be canned, being first cleaned and otherwise prepared, is placed in the trough 33, the foremost end being up against the back of chute 31 through opening 32. One of the blades 21 of the revolving knife, cuts the fish off at this point, and the fingers 28, following the knife, push the cut section of fish through the said chute, the fingers 28 remaining practically vertical during their passage through slots 34 by reason of the action of cam groove 25 and cranks 23. As soon as the first section of fish has been severed and pushed along, the remainder of the fish slides into place, and is prevented from entering the chute 31 by reason of the plate 36, which actuated by the cam 42, slides up and closes the chute until the next knife blade comes by, whereupon the said knife blade 36 is lowered and clears the opening of the next cut segment of fish.

At the end of the area of action of the fingers 28, the fingers 49 take hold and further push the severed section of fish into the chamber 57, the bottom of which is closed by plate 93. At this point the blocks 72 come together, compressing the fish into the shape of a can, and the sliding plates 85 likewise close together except for a small space between them. Meanwhile the cans to be filled, fed between guides 100, are successively engaged with pockets 99, until a can comes to rest directly under the plunger 59, being held there for the requisite length of time by the action of the Geneva movement 111 and 115 underneath, which controls the feeding of the cans.

As soon as one of the cans is centered, the slide 93 is operated by means of cam 125, until the orifice 95 is also centrally located. The members 62 and 63 actuated by the cam 71 then descend, the chisel edge of 62 cutting off any shreds of fish which may not be completely severed by the cutting plates 85 and which remain between the cutting edges thereof connected to the fish in the trough 31, while the blade 63 extends down into the can just inside the edge thereof, the groove 64 therein forming a passage for the escape of air from the bottom when the fish is pushed into the can. Immediately following the action of members 62 and 63, the cam 116 operate the member 120 to bring the head 123 into position to clamp the can against its pocket 99 in the star-wheel member 98, while abutment plunger 132, operating on the raised track 130 of plate 129, is moved upwardly, carrying with it the can, which is thereby moved and pressed against the bottom of the filling chamber 57 after the plunger 132 has reached the limit of its upward movement. Then the plunger 59, likewise operated by the cam 71, descends and forces the lump of fish held between blocks 72 into the can, and compresses it within the latter; following which both plungers move downwardly together, whereby the can is lowered to the table 44. The plunger 59 is then raised to its normal position. As soon as this operation is completed, this can is moved along the table 44 by the star wheel member 98, and another one takes its place by reason of the aforesaid Geneva movement, while plate 93 again slides back, covering chamber 57, till the operation has again reached the point where the plunger, etc., descend.

Just at the point where one of the filled cans is under the salt-spout 146, the rod 161 pulling the dog 154 against the ratchet 155 causes shaft 151, and hence shaft 134, to rotate one-eighth of a turn. Member 139 also rotates a corresponding distance, and one of the pockets 140, being then positioned as shown with regard to knife edge or scraper 137, the salt therein, gathered while said pocket was open to the salt in the main container, is scraped from said pocket by said scraper owing to and during the period of rotation, going thence into orifice 145, down spout 146 and thence into the can.

Should member 139, or shaft 134, become clogged and bind, or for any other reason refuse to turn, the cotter pins 152, being all that hold the two shafts 134 and 151 together, will pull out, thus releasing shaft 134 and preventing any possible breakage from occurring.

Having thus explained the nature of the invention, and described an operative manner of constructing and using the same, although without attempting to set forth all of the forms in which it may be made, or all of the forms of its use, the following is claimed:

1. An improvement in canning machines of the character described comprising a feed trough, a cutter operating transversely of said trough, a filling chamber, independently movable primary feed members to advance the material cut, and means cooperating with said feed members to transfer material from said trough to said filling chamber.

2. An improvement in canning machines of the character described comprising a feed trough, a cutter operating transversely of said trough, a filling chamber, independently movable primary feed members to advance the material cut, and an auxiliary feed member positioned to transfer material to said filling chamber as said material is delivered by said primary feed members.

3. An improvement in canning machines of the character described comprising a feed trough, a cutter operating transversely of said trough, a filling chamber, independently movable primary feed members to advance the material cut, and an oscillatory auxiliary feed member interposed between said cutter and said filling chamber.

4. An improvement in canning machines of the character described comprising a feed trough, a cutter operating transversely of said trough, a filling chamber, independently movable primary feed members carried by said cutter, an oscillatory member interposed between the cutter and the filling chamber, feed rods slidably extended through said member, and means for reciprocating said rods.

5. An improvement in canning machines of the character described comprising a feed trough, a cutter operating transversely of said trough, a filling chamber, independently movable primary feed members carried by said cutter, an oscillatory member interposed between the cutter and the filling chamber, feed rods slidably extended through said member, a crank member connected with said rod, and means for operating the crank member.

6. An improvement in canning machines of the character described comprising a feed trough, a cutter operating transversely of said trough, a filling chamber, independently movable primary feed members carried by said cutter, an oscillatory member interposed between the cutter and the filling chamber, feed rods slidably extended through said member, a crank member provided with an upright pin thereon having a rotatable movement independent of the crank member and connected to said rods, and means for rotating said crank member whereby said rods are actuated to have an intermittent forward feeding movement.

7. In a canning machine, a filling chamber having a fixed discharge opening, a movable bottom wall normally closing said opening, means for feeding cans under said chamber, a pair of oppositely movable compressor members at the sides of the chamber and of said opening therein, means for feeding material into said chamber, compressor members being operated to compress the material into the chamber transversely, cutting means at the entrance of said chamber to cut the surplus material rejected by said compressor members and to close the chamber to the the material fed thereto, while the compressor members are operating, and a plunger in the top wall of the chamber to operate between said compressor members to eject the material from said chamber and to press it into the can positioned under the chamber, said bottom wall being actuated to open the discharge opening upon operation of the plunger.

8. In a canning machine, a filling chamber having a fixed discharge opening in an end wall thereof, a movable wall normally closing said opening, means for feeding cans in alinement with the opening in said chamber, means for feeding material into the chamber from a side wall thereof, compressor members arranged in the chamber on opposite sides of said opening and movable toward each other to compress the material transversely, cutting means arranged at the entrance of said chamber to sever the material in the chamber from the material being fed into said entrance, a plunger in the opposite end wall of the chamber to operate between said compressor members to eject the compressed material and move it into a can alined with said discharge opening, and means for actuating said bottom wall to open the discharge opening upon the operation of said plunger, said cutting means being operated to close the entrance of said chamber during the operations of said compressor members and said plungers.

9. In a canning machine, a filling chamber having a movable bottom wall normally closing same, means for feeding cans under said chamber, means for feeding material into the chamber, compressor members arranged in the chamber and movable toward each other to compress the material transversely to the size of the can, a plunger in the upper wall of the chamber to operate between said compressor members, and means operating in synchronism with the plunger for trimming material projecting beyond the meeting edges of said compressor members, and means for operating said bottom wall to open the chamber and permit said plunger to eject the compressed material therefrom.

10. In a canning machine, a filling chamber, means for positioning cans thereunder, means for feeding material into said chamber, means for compressing the material transversely in the chamber, a plunger for forcing material from the chamber into a can therebeneath, a trimming device positioned adjacent the plunger and to move in advance of the plunger to trim off portions of the material projecting beyond the edges of said compressing means and which portions hinder the insertion of the material into the can.

11. In a canning machine, a filling chamber, means for positioning cans thereunder, means for feeding material to said chamber, means in the chamber for compressing the material to the size of the can, cutting means for severing the material in the compressing means from the material being fed into said chamber, a plunger for subsequently forcing the material from the chamber into a can therebelow, trimming means to move in advance of the plunger and operating synchronously therewith to cut shreds of material extending between said compressing means and said cutting means.

12. In a canning machine, a filling chamber, means for positioning the cans relative to said filling chamber, means for feeding material into said chamber, means for compressing the material in the chamber to substantially the size of a can, cutting means arranged at the entrance of the chamber to sever the surplus material rejected by said compressing means, a plunger for moving the compressed material into a can positioned relative to said chamber, and trimming means to be operated synchronously with the movement of the plunger to cut the material projecting beyond said compressing means.

13. In a canning machine, a filling chamber periodically receiving quantities of material and having a discharge opening therein, a movable wall normally closing said opening, means for positioning a can relative to said chamber, a plunger arranged to aline with said chamber and with said positioned can, means in the chamber for compressing the material to substantially the size of the can, a second plunger arranged to aline with said first mentioned plunger and positioned on the opposite side of said chamber relative to said first plunger, means for moving said first plunger toward the chamber, whereby the can is positioned against the chamber to receive the material discharge from said opening therein, and means for subsequently moving said second plunger toward the chamber to force the compressed material from the chamber and to press it into said can.

14. In a canning machine, a filling chamber periodically receiving quantities of material and having a discharge opening therein, a movable bottom wall normally closing the same, a member disposed under the chamber and having a plurality of substantially semi-circular pockets in an edge thereof, means for progressively feeding cans one in each pocket of said member, said member being intermittently operated to position a can under said chamber, an arm having a semi-circular grip piece arranged opposite said pocketed member and operable to grip the cans as successively brought in position under the chamber, a plunger arranged under the chamber and in alinement with the positioned can, a second plunger arranged above said chamber and in alinement with the positioned can, means for operating said second plunger for forcing the material in the chamber through the discharge opening therein, and means for moving said bottom wall to open the chamber and to move said first plunger upwardly to said opening, said second plunger being operated to eject the material into said can.

15. In a canning machine, a notched wheel on a vertical shaft for successively feeding cans, a filling chamber arranged over said wheel at a point adjacent its notched periphery, a plunger reciprocally mounted under said wheel and in alinement with said filling chamber, driving means for said shaft, and a connection between said driving means and said shaft for intermittently rotating the same, whereby said notched wheel will progressively position a can over said plunger, a cam loosely mounted about said shaft and in engagement with said plunger, an operative connection between said cam and said driving means for continuously rotating the cam, whereby the plunger is raised and lowered to press the can against the bottom of the filling chamber and away from the latter, and means for ejecting the material from the filling chamber into the can when the can is moved toward the filling chamber.

16. In a canning machine as set forth in claim 15, including in combination, means actuated from said cam for engaging and maintaining the can in position while being moved by said plunger.

17. In a canning machine, a shaft having means thereon for successively feeding cans, a filling chamber arranged over said feeding means, a plunger reciprocally mounted under said means and in alinement with the filling chamber, driving means for the shaft, a connection between the driving means and the shaft for intermittently rotating the latter, whereby a can will be successively positioned over said plunger, a cam loose on the shaft and having an operable connection with said driving means for continuously rotating the cam, said plunger having engagement with the cam surface of said cam whereby it is raised and lowered to move the can toward and away from the filling chamber, and means for discharging the material in a filling chamber into the can when the can is moved toward the said chamber.

18. In a canning machine as set forth in claim 17, including in combination, a second cam on said shaft, means actuated from said second cam for engaging and maintaining the can in position while being moved by said plunger.

In testimony whereof I affix my signature.

JOHN F. ANDERSON.